US011852176B2

(12) United States Patent
Haeussler et al.

(10) Patent No.: US 11,852,176 B2
(45) Date of Patent: Dec. 26, 2023

(54) EXPANSION ANCHOR WITH ADDITIONAL EXPANSION ELEMENT

(71) Applicant: Hilti Aktiengesellschaft, Schaan (LI)

(72) Inventors: Karl Haeussler, Lunden (CH); Hideki Shimahara, Grabs (CH); Mareike Frensemeier, Buchs (CH); Yijun Li, Buchs (CH); Wentao Yan, Buchs SG (CH); Arturo Guevara Arriola, Irving, TX (US)

(73) Assignee: Hilti Aktiengesellschaft, Schaan (LI)

( * ) Notice: Subject to any disclaimer, the term of this patent is extended or adjusted under 35 U.S.C. 154(b) by 616 days.

(21) Appl. No.: 16/976,992

(22) PCT Filed: Feb. 19, 2019

(86) PCT No.: PCT/EP2019/054033
§ 371 (c)(1),
(2) Date: Aug. 31, 2020

(87) PCT Pub. No.: WO2019/170405
PCT Pub. Date: Sep. 12, 2019

(65) Prior Publication Data
US 2021/0003160 A1     Jan. 7, 2021

(30) Foreign Application Priority Data

Mar. 5, 2018     (EP) ...................... 18159864

(51) Int. Cl.
*F16B 13/06* (2006.01)
*F16B 13/08* (2006.01)
*F16B 13/00* (2006.01)

(52) U.S. Cl.
CPC .......... *F16B 13/065* (2013.01); *F16B 13/068* (2013.01); *F16B 13/0858* (2013.01); *F16B 13/066* (2013.01); *F16B 2013/007* (2013.01)

(58) Field of Classification Search
CPC .. F16B 13/065; F16B 13/0858; F16B 13/066; F16B 2013/007; F16B 13/063;
(Continued)

(56) References Cited

U.S. PATENT DOCUMENTS 3,855,896 A * 12/1974 Kaufman ............... F16B 13/065
411/60.1
4,002,100 A *  1/1977 Bucheli ................. F16B 13/122
411/61
(Continued)

FOREIGN PATENT DOCUMENTS

DE        34 45 713 A1    6/1986
DE       197 29 235 A1    1/1999
(Continued)

OTHER PUBLICATIONS

PCT/EP2019/054033, International Search Report dated May 17, 2019 (Two (2) pages).

*Primary Examiner* — Victor D Batson
*Assistant Examiner* — Jock Wong
(74) *Attorney, Agent, or Firm* — Crowell & Moring LLP

(57) ABSTRACT

An expansion anchor includes an anchor bolt and an expansion sleeve which encompasses the anchor bolt. The anchor bolt has an expansion-sleeve expansion region and an expansion-element expansion region. The expansion sleeve has an expansion element which is disposed on the expansion sleeve. The expansion sleeve is radially displaceable by the expansion-sleeve expansion region and the expansion element is radially displaceable by the expansion-element expansion region. The expansion element is disposed on the expansion sleeve on a side of the expansion sleeve that radially faces the anchor bolt.

14 Claims, 2 Drawing Sheets

(58) Field of Classification Search
CPC .... F16B 13/122; F16B 13/124; F16B 13/128; F16B 13/0891; F16B 13/068
USPC .... 411/55, 32, 33, 57.1, 60.1, 60.2, 60.3, 21
See application file for complete search history.

(56) References Cited

U.S. PATENT DOCUMENTS

| | | | | |
|---|---|---|---|---|
| 4,193,246 | A | * | 3/1980 | Schiefer ................. F16B 13/08 411/75 |
| 4,596,503 | A | * | 6/1986 | Mirsberger ............. F16B 13/02 411/74 |
| 4,656,806 | A | | 4/1987 | Leibhard et al. |
| 4,673,320 | A | * | 6/1987 | Froehlich ................ F16B 13/12 411/39 |
| 4,869,631 | A | * | 9/1989 | Froehlich ............ F16B 13/066 411/60.2 |
| 4,921,381 | A | | 5/1990 | Gschwend et al. |
| 4,971,494 | A | * | 11/1990 | Gauthier ............. F16B 13/0858 411/61 |
| 10,508,675 | B2 | | 12/2019 | Wissling |
| 2002/0071727 | A1 | * | 6/2002 | Kaibach ................ F16B 13/066 405/259.1 |
| 2014/0263903 | A1 | * | 9/2014 | Ostrobrod ............ F16B 7/1409 248/222.12 |
| 2016/0238051 | A1 | * | 8/2016 | Schaeffer ............. F16B 13/065 |

FOREIGN PATENT DOCUMENTS

| | | | |
|---|---|---|---|
| DE | 10 2011 087 548 A1 | 6/2013 | |
| EP | 0 134 391 A1 | 3/1985 | |
| EP | 0 267 148 A1 | 5/1988 | |
| EP | 2 689 147 B1 | 1/2014 | |
| GB | 1496970 A * | 1/1978 | ............ F16B 13/066 |
| IT | 201800020695 A1 | 6/2020 | |

* cited by examiner

EXPANSION ANCHOR WITH ADDITIONAL EXPANSION ELEMENT

CROSS REFERENCE TO RELATED APPLICATIONS

This application claims the priority of International Application No. PCT/EP2019/054033, filed Feb. 19, 2019, and European Patent Document No. 18159864.0, filed Mar. 5, 2018, the disclosures of which are expressly incorporated by reference herein.

BACKGROUND AND SUMMARY OF THE INVENTION

The invention relates to an expansion anchor. An expansion anchor of this kind is equipped with an anchor bolt, an expansion sleeve which encompasses the anchor bolt, the anchor bolt having an expansion-sleeve expansion region for radially displacing the expansion sleeve, and at least one additional expansion element which is arranged on the expansion sleeve, the anchor bolt comprising an additional-expansion-element expansion region for radially displacing the additional expansion element.

EP0267148 A1 discloses an expansion anchor having two expansion sleeves arranged one behind the other. An expansion cone is arranged in front of each of these expansion sleeves. During mounting, each of the two expansion sleeves is radially widened at the front end thereof.

EP0134391 A1 discloses an expansion anchor, an additional expansion element being arranged on the expansion sleeve and being radially displaced by a slope formed on the expansion sleeve.

EP2689147 B1 discloses an expansion anchor, the expansion sleeve of which comprises protrusions that project radially outward in order to increase initial friction between the expansion sleeve and the concrete. In particular, protrusions of this kind can be obtained in an embossing process.

U.S. Pat. No. 4,921,381 A discloses an expansion anchor, the expansion sleeve of which has an opening in which a ball is radially displaceably mounted. During anchoring, the ball travels on a ramp on the anchor bolt, causing the ball to be radially displaced. As a result, the ball is brought into a position that radially projects beyond the expansion sleeve, and creates an interlocking engagement with the wall of the borehole. When the anchor bolt is further axially displaced relative to the expansion sleeve, the expansion sleeve is also radially widened by means of an expansion cone of the anchor bolt.

The problem addressed by the invention is that of providing an expansion anchor which has particularly good load values, in particular in different load situations, with little production and mounting complexity, and which particularly can be used in many different ways.

An expansion anchor according to the invention is characterized in that the additional expansion element is arranged on the expansion sleeve on the side of the expansion sleeve that radially faces the anchor bolt.

At least one further, independent expansion element—the additional expansion element—is thus provided on the expansion sleeve, which expansion element, like the expansion sleeve itself, can be radially widened and anchored by means of an expansion region that is arranged on the anchor bolt. By providing a plurality of expanding elements, additional structural degrees of freedom are made available which can allow the expansion anchor to be adapted particularly well to different load situations in a particularly simple manner. In particular, the expansion function on the expansion sleeve can be supplemented by additional expansion on the additional expansion element. Another concept can be considered to be that of actuating the additional expansion element, just like the expansion sleeve, by means of the anchor bolt. For this purpose, according to the invention, the additional expansion element faces the anchor bolt for an interaction between the anchor bolt and the additional expansion element, and the anchor bolt has an expansion region dedicated to the additional expansion element, namely the additional-expansion-element expansion region. The at least one additional expansion element thus expands on its own expansion surface, in particular independently of the primary expansion of the expansion sleeve. By virtue of this design, the expansion processes of the expanding elements can be coordinated in a particularly simple and simultaneously reliable manner, such that particularly good load values, in particular in different load situations, can be obtained. According to a basic concept of the invention, the additional expansion element is arranged on the expansion sleeve on the side of the expansion sleeve that radially faces the anchor bolt, i.e., on the inside of the expansion sleeve. Accordingly, the additional expansion element is located radially between the anchor bolt and the expansion sleeve, such that the additional-expansion-element expansion region of the anchor bolt can, preferably directly, act against the additional expansion element. In particular, the additional expansion element is not exposed radially on the outside, but is at least partially covered radially on the outside by the expansion sleeve. The additional expansion element can, if the element is radially displaced by the additional-expansion-element expansion region, in turn radially displace the radially more external region of the expansion sleeve and can press the expansion sleeve against the encompassing hole wall, in particular while forming an undercut, and can thus anchor the expansion sleeve in the borehole. In addition, the radially more external expansion sleeve can secure the additional expansion element on the expansion anchor before mounting. The expansion anchor can therefore be given particularly good efficiency and handleability in a particularly simple manner.

The additional expansion element preferably projects radially inward toward the anchor bolt via the expansion sleeve. In particular, the additional expansion element is located at the level of the expansion sleeve, i.e., the expansion sleeve overlaps the additional expansion element in an axial direction.

The expansion-sleeve expansion region of the anchor bolt can radially displace the expansion sleeve if the expansion-sleeve expansion region is retracted into the expansion sleeve, in particular if the expansion-sleeve expansion region is shifted axially backward relative to the expansion sleeve. The expansion-sleeve expansion region is preferably used to radially displace the expansion sleeve when the expansion-sleeve expansion region is axially shifted backward relative to the expansion sleeve. The expansion-sleeve expansion region of the anchor bolt expediently converges toward the back, which is intended to include in particular that, in the expansion-sleeve expansion region, the surface of the anchor bolt approaches, in particular continuously approaches, the longitudinal axis of the anchor bolt toward the back. For example, the expansion-sleeve expansion region can form a cone shape.

The additional-expansion-element expansion region of the anchor bolt can radially displace the additional expansion element if the additional-expansion-element expansion region is shifted axially backward relative to the additional expansion element. The additional-expansion-element expansion region is preferably used to radially displace the additional expansion element when the additional-expansion-element expansion region is axially shifted backward relative to the additional expansion element. The additional-expansion-element expansion region of the anchor bolt expediently converges toward the back, which is intended to include in particular that, in the additional-expansion-element expansion region, the surface of the anchor bolt approaches, in particular continuously approaches, the longitudinal axis of the anchor bolt toward the back.

The expansion-sleeve expansion region and the additional-expansion-element expansion region are preferably spaced apart from one another, in particular axially, which can be advantageous with regard to the design. In particular, the expansion-sleeve expansion region and the additional-expansion-element expansion region form inclined slopes with respect to the longitudinal axis of the anchor bolt.

The additional expansion element expediently touches the anchor bolt, at least temporarily during the mounting process and preferably also already before the mounting process, in particular at the additional-expansion-element expansion region thereof. This can be advantageous in terms of reliability and design complexity.

Insofar as the axial direction, the circumferential direction and the radial direction are mentioned here, this is intended to refer in particular to the longitudinal axis of the anchor bolt, which axis can in particular coincide with the longitudinal axis of the expansion anchor. The longitudinal axis of the anchor bolt extends in particular in a mounting direction, i.e., in the direction in which the anchor bolt is pushed into a borehole when the anchor bolt is mounted as intended, and/or in a pull-out direction. i.e., in the direction in which the anchor bolt is loaded as intended after mounting. The directions "front" and "back" and/or "rear" are intended to be used here uniformly, in particular insofar as these directions are used in connection with the anchor bolt, the expansion sleeve and the additional expansion element. In particular, the directions are intended to relate to the axial direction.

The anchor bolt can also be formed in multiple parts and comprise, for example, an anchor rod and a front part that is screwed to the anchor rod, on which front part the expansion-sleeve expansion region and preferably also the additional-expansion-element expansion region are arranged. However, the anchor bolt is particularly preferably formed in one piece. The expansion sleeve, the at least one additional expansion element and/or the anchor bolt preferably consist of a metal material. The expansion sleeve and the additional expansion element are preferably separate parts. In particular, the expansion-sleeve expansion region and the additional-expansion-element expansion region are arranged in a tension-resistant manner on the anchor bolt, such that tensile forces that are directed backward can be transmitted via these regions.

The expansion sleeve encompasses the anchor bolt, in particular annularly. The expansion sleeve preferably forms an open ring, i.e., a C-shape, in which the anchor bolt is received. This can allow particularly simple production by winding a belt around the anchor bolt. The expansion sleeve and the anchor bolt are preferably arranged coaxially.

The anchor bolt can have a load application structure in a rear region of the anchor bolt. The load application structure is used to introduce tensile forces directed in the pull-out direction into the anchor bolt. The load application structure can be an external thread or an internal thread, for example.

In another embodiment, the load application structure can also be a head that forms a maximum cross section.

Unless stated otherwise, the features described here are intended to apply preferably to a non-mounted expansion anchor, i.e., an expansion anchor before mounting, and/or to a state in which the additional-expansion-element expansion region has not yet radially shifted the additional expansion element.

The expansion anchor can also comprise a plurality of additional expansion elements, of which at least some, preferably all, are designed as explained here in connection with a single additional expansion element. If a plurality of additional expansion elements is provided, the anchor bolt preferably comprises a plurality of additional-expansion-element expansion regions, one for each additional expansion element. The additional-expansion-element expansion regions are preferably separated from one another.

The expansion sleeve preferably comprises a driver, which is oriented toward the front, for the additional expansion element. This driver can fix the additional expansion element in place axially relative to the expansion sleeve if the anchor bolt is moved backward relative to the expansion sleeve, such that the additional-expansion-element expansion region can act against the additional expansion element.

In a particularly advantageous embodiment of the invention, the additional expansion element can touch, in particular radially on the outside of the additional expansion element, the expansion sleeve, in particular on a tongue of the expansion sleeve as described in detail below. This can further reduce production complexity and/or improve handleability.

It is particularly preferred that the additional expansion element is arranged in a recess formed in the expansion sleeve. On the wall of this recess, the aforementioned driver for the additional expansion element can be formed in a structurally particularly simple manner. The additional expansion element can be positioned particularly simply and reliably by means of a recess of this kind. In particular, the recess extends radially outward, starting from the radial inside of the expansion sleeve, into the expansion sleeve.

It can preferably be provided that the expansion sleeve is perforated at the recess, in particular radially. According to this embodiment, the additional expansion element can act particularly effectively against the hole wall encompassing the expansion anchor in a structurally particularly simple manner and can thus cause particularly efficient anchoring with little complexity.

It is particularly preferred that the expansion sleeve has a tongue which covers the recess and/or the additional expansion element at least in regions, in particular radially. In particular, the additional expansion element is arranged radially between the tongue and the anchor bolt. In particular, the additional expansion element can, if the element is radially displaced by the additional-expansion-element expansion region, in turn radially displace the tongue and press the tongue against the encompassing hole wall, in particular while forming an undercut, and can thus anchor the tongue in the borehole. Furthermore, the tongue can secure the additional expansion element on the expansion anchor before mounting. The tongue, which can also be referred to as a tab, is in particular free on three sides.

The tongue is part of the expansion sleeve. The tongue is preferably designed to be integral with the rest of the expansion sleeve. The tongue can be manufactured in a particularly simple manner by cutting the expansion sleeve on three sides, the fourth side forming a hinge of the tongue. When manufacturing the expansion anchor, it can be provided that the tongue is bent, then the additional expansion element is arranged in the recess and then the tongue is bent back and the additional expansion element is hereby secured in the recess by the tongue. In particular, the additional expansion element s arranged between the tongue and the anchor bolt.

It is particularly preferred that the tongue points away from the expansion-sleeve expansion region, i.e., in particular points backward. In particular, the tongue can be articulated at the front. This can be advantageous in terms of production complexity and functionality.

The tongue expediently projects radially on the outside of the expansion sleeve, i.e., in particular on the side of the expansion sleeve that radially faces away from the anchor bolt. This can further simplify manufacture. In addition, the tongue can rub against the hole wall at the beginning of the mounting process and thus secure the expansion sleeve axially on the hole wall. In particular, the tongue can form a barb to prevent the expansion sleeve from being pulled out of a borehole and can thus secure the expansion sleeve particularly effectively in the hole wall at the beginning of the mounting process. Accordingly, the tongue is inclined toward the longitudinal axis such that the tongue approaches the longitudinal axis toward the front, i.e., in particular toward the expansion-sleeve expansion region, i.e., the tongue opens backward and/or the tongue points backward.

Another preferred embodiment of the invention is that the additional expansion element is a rolling element. This can include in particular that the additional expansion element comprises at least one axis of symmetry, about which a rotation through any angle maps the element onto itself. This can be advantageous with regard to the production complexity and to the expansion mechanism.

The additional expansion element can have, for example, a spherical shape, a cylindrical shape, a block shape, a teardrop shape or a wedge shape.

Another expedient development of the invention is that the additional-expansion-element expansion region and the expansion-sleeve expansion region are of different steepness. This can include in particular that the maximum acute angles with the longitudinal axis of the two expansion regions are different. As a result, the anchoring behavior can be adapted particularly well to the boundary conditions.

It is particularly preferred that the anchor bolt comprises an indentation in which the additional expansion element is, at least initially, arranged. In particular, the additional-expansion-element expansion region can be formed on a wall of the indentation, in particular on a front wall of the indentation. This can reduce the design complexity even further. The indentation can be arranged, for example, in a neck region of the anchor bolt, in which region the anchor bolt is circular cylindrical. However, the indentation can also be arranged in a conical expansion-sleeve expansion region. The indentation extends radially into the anchor bolt. In particular, the indentation in the anchor bolt can be opposite the recess that is formed in the expansion sleeve.

In one embodiment of the expansion anchor, the expansion sleeve can be formed in multiple layers, in particular in two layers. The expansion sleeve can thus consist of, for example, two individual sleeves nested one inside the other, which have comparatively small wall thicknesses. The associated easier bendability can reduce the mounting energy. Expansion sleeves in multiple layers can provide additional degrees of freedom in order to control the timing of the additional expansion It is particularly preferred that the anchor bolt has a driver which can drive the expansion sleeve toward the front, in particular when mounting the expansion anchor. As a result, the materials expenditure can be reduced even further, in particular for the expansion sleeve. The driver can engage the expansion sleeve, in particular from the rear, and drive the expansion sleeve toward the front when the anchor bolt is shifted toward the front. It is particularly preferred that the driver is a stop shoulder, in particular formed in the longitudinal section of the anchor bolt. This can be advantageous, inter alia, with regard to the manufacturing complexity. In particular, the stop shoulder can extend annularly around the anchor bolt and/or the longitudinal axis thereof.

The invention also relates to the intended use of the expansion anchor, in particular the intended mounting of the expansion anchor. In particular, the invention relates to the use of an expansion anchor according to the invention, the anchor bolt being shifted relative to the expansion sleeve, in particular backward, and the expansion sleeve being radially displaced by the expansion-sleeve expansion region and the additional expansion element being radially displaced by the additional-expansion-element expansion region. When loaded, the anchor bolt, together with the expansion-sleeve expansion region thereof, travels backward relative to the expansion sleeve. The additional expansion element is axially fixed in position by the expansion sleeve and moved radially outward via the additional-expansion-element expansion region.

The time sequence of the expansion of the expansion sleeve and the additional expansion element can be set, from a design perspective, in a particularly simple manner by varying the position of the recess in the expansion sleeve and the position of the indentation in the anchor bolt and/or by shaping the recess in the expansion sleeve and shaping the indentation in the anchor bolt. By varying the size of the additional expansion element, the mounting diameter of the expansion anchor and the degree of possible additional expansion and the mounting energy can be set, from a design perspective, in a particularly simple manner: Small additional expansion elements render the initial diameter smaller and render the mounting easier. If the additional expansion element is enlarged, higher mounting energy is required.

Features which are explained in connection with the expansion anchor according to the invention can also be used in the use according to the invention, and, conversely, features which are explained in connection with the use according to the invention can also be used in the expansion anchor according to the invention.

The invention is explained in greater detail in the following with reference to preferred embodiments, which are shown schematically in the accompanying drawings, it being possible to implement individual features of the embodiments shown in the following in principle individually or in any desired combination within the context of the invention.

DETAILED DESCRIPTION OF THE DRAWINGS

Figure 1:
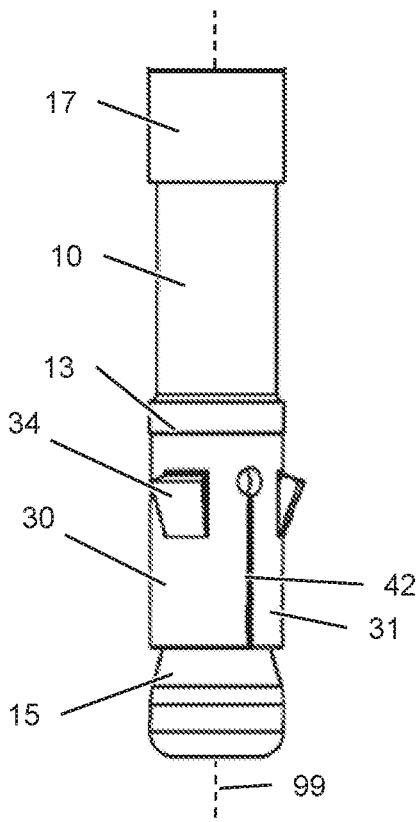
FIG. 1 is a side view of a first embodiment of an expansion anchor according to the invention.
Figure 2:
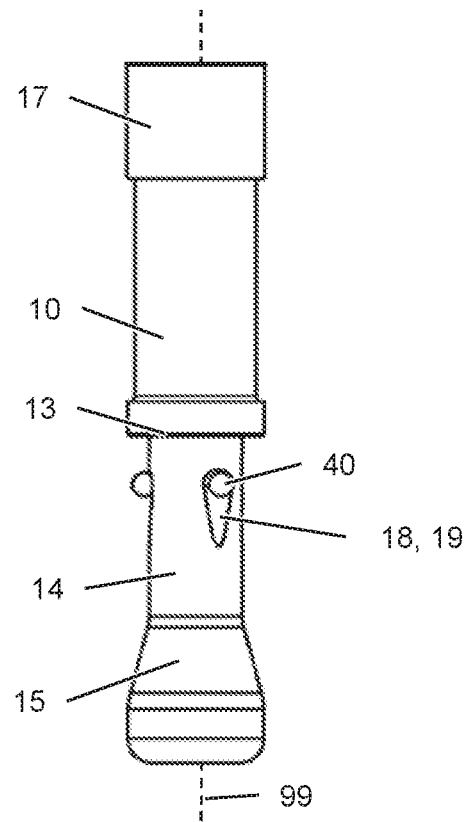
FIG. 2 is a side view of the anchor bolt of the expansion anchor from FIG. 1 together with the additional expansion elements, but without the expansion sleeve.
Figure 3:
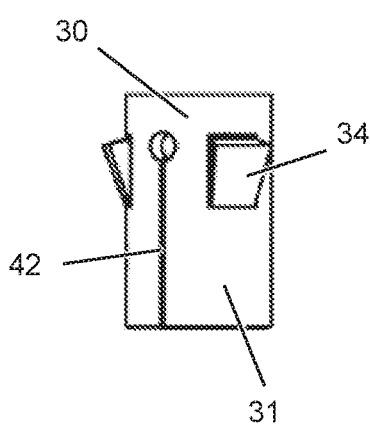
FIG. 3 is a side view of the expansion sleeve of the expansion anchor from FIG. 1.
Figure 4:
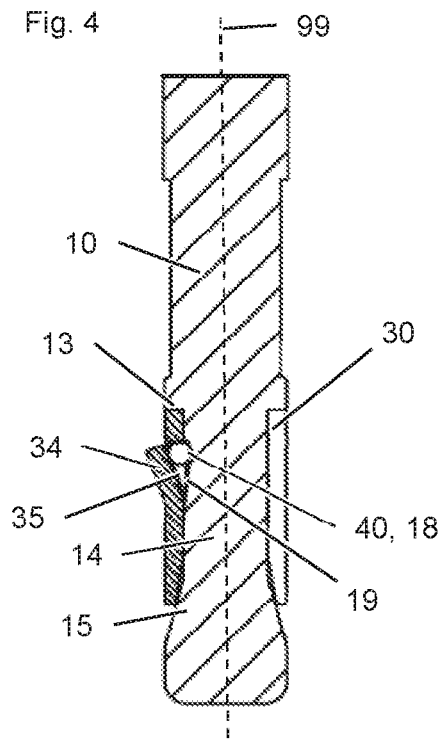
FIG. 4 is a longitudinal sectional view of the expansion anchor from FIG. 1.

FIGS. 1 to 4 show a first embodiment of an expansion anchor according to the invention. The expansion anchor comprises an anchor bolt 10 having a longitudinal axis 99, and an expansion sleeve 30, the expansion sleeve 30 annularly encompassing the anchor bolt 10. The anchor bolt 10 has a neck region 14 having an at least approximately constant cross section. Adjoining the neck region 14, the anchor bolt 10 comprises an expansion-sleeve expansion region 15 for the expansion sleeve 30 in front of the neck region 14, in the front end region of the anchor bolt 10, which expansion region is, here by way of example, integral with the rest of the anchor bolt 10. At the expansion-sleeve expansion region 15, the anchor bolt 10 widens on its outer surface toward the front starting from the neck region 14, i.e., the expansion-sleeve expansion region 15 converges toward the back on its outside. The expansion sleeve 30 encompasses the neck region 14 of the anchor bolt 10. The expansion-sleeve expansion region 15 is mostly arranged in front of the expansion sleeve 30. The neck region 14 is circular cylindrical here and the expansion-sleeve expansion region 15 is conical.

The anchor bolt 10 also comprises a driver 13, for example in the form of a circular ring, which limits an axial movement of the expansion sleeve 30 toward the rear end of the anchor bolt 10, i.e., an axial movement of the expansion sleeve 30 away from the expansion-sleeve expansion region 15.

At its rear end region opposite the expansion-sleeve expansion region 15, the anchor bolt 10 comprises a load application structure 17, shown here, for example, as an external thread, for introducing tensile forces into the anchor bolt 10. A nut (not shown) having a corresponding internal thread can be arranged on the external thread.

The expansion sleeve 30 comprises a plurality of slits 42 which extend, starting from the front end face of the expansion sleeve 30, which faces the expansion-sleeve expansion region 15, axially backward into the expansion sleeve 30. The slits 42 separate expansion tongues 31 of the expansion sleeve 30 from one another. The expansion tongues 31 are each free on the front side thereof and on the two opposite longitudinal sides thereof, and are interconnected on the respective rear sides thereof. The expansion tongues 31 are thus free at the front and point axially toward the front, toward the expansion-sleeve expansion region 15.

The expansion sleeve 30 comprises a plurality of recesses 35 which extend radially outward from the radial inside of the expansion sleeve 30. The anchor bolt 10 comprises, in particular in the neck region 14 thereof, a plurality of radial indentations 18 which extend radially inward into the anchor bolt 10. Each indentation 18 in the anchor bolt 10 is covered by a recess 35 to form an indentation-recess pair. An additional expansion element 40 is arranged in each of the indentation-recess pairs. An inclined wall is arranged at the front end of each indentation 18 and forms an additional-expansion-element expansion region 19 for radially displacing the particular additional expansion element 40 outward.

The expansion sleeve 30 is radially perforated at the recesses 35. However, the expansion sleeve 30 has tongues 34, each recess 35 being radially covered by a tongue 34. The tongues 34 project radially outward on the expansion sleeve 30. Each of the tongues 34 is connected at the front end thereof to the remaining expansion sleeve 30. The tongues 34 are thus free at the rear and point backward, away from the expansion-sleeve expansion region 15. The tongues 34 are made in one piece together with the rest of the expansion sleeve 30. In particular, the tongues 34 can each be formed by cutting the expansion sleeve 30 in a U-shape.

When the expansion anchor is mounted, the front end of the anchor bolt 10 is pushed into a borehole in the direction of the longitudinal axis 99 of the expansion anchor 10. By virtue of the driver 13, which limits displacement of the expansion sleeve 30 toward the back end of the anchor bolt 10, the expansion sleeve 30 is also inserted into the borehole. The anchor bolt 10 is then pulled slightly out of the borehole again, for example by tightening a nut that is arranged on the load application structure 17 which is in the form of an external thread. Due to friction with the borehole wall, which friction is generated in particular on the radially outward projecting tongues 34, the expansion sleeve 30 remains behind and the anchor bolt 10 is axially displaced backward relative to the expansion sleeve 30. The additional expansion elements 40 are held in the recesses 35 in the expansion sleeve 30 axially on the expansion sleeve 30, resulting in a backward axial displacement of the anchor bolt 10 relative to the additional expansion elements 40. In the course of this displacement, the expansion tongues 31 of the expansion sleeve 30 run onto the expansion-sleeve expansion region 15 and are pushed by the expansion region radially outward against the borehole wall, and the additional expansion elements 40 run onto the additional-expansion-element expansion regions 19 thereof and are pushed by the expansion regions radially outward against the particular radially overlying tongue 34, which in turn is pushed radially outward against the hole wall. The expansion anchor is fixed in the substrate by these mechanisms.

In the embodiment of FIGS. 1 to 4, the additional expansion elements 40 are spherical and the indentations 18 are teardrop-shaped, the additional-expansion-element expansion regions 19 tapering toward the front.

Figure 5:
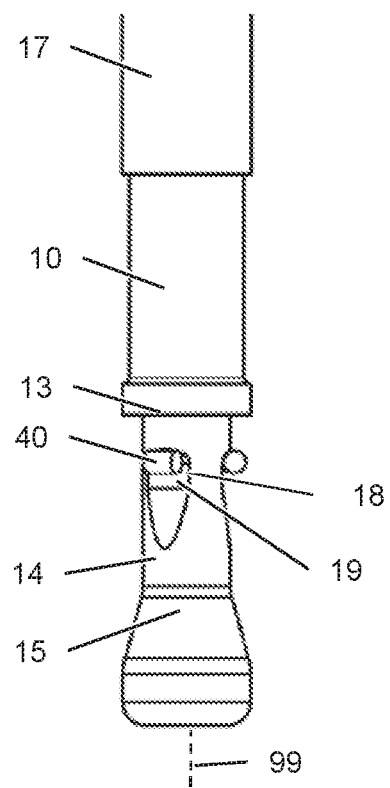
FIG. 5 is a side view, analogous to FIG. 2, of the anchor bolt together with the additional expansion elements and without the expansion sleeve, of a first modification to the expansion anchor of FIGS. 1 to 4.

In a first modification of the first embodiment, as shown in FIG. 5, the additional expansion elements 40 are circular cylindrical and the indentations 18 are designed to be correspondingly wider. Otherwise, this first modification corresponds to the first embodiment, and therefore reference is made to FIGS. 1, 3 and 4 and to the description of the first embodiment, which also apply to the first modification.

Figure 6:
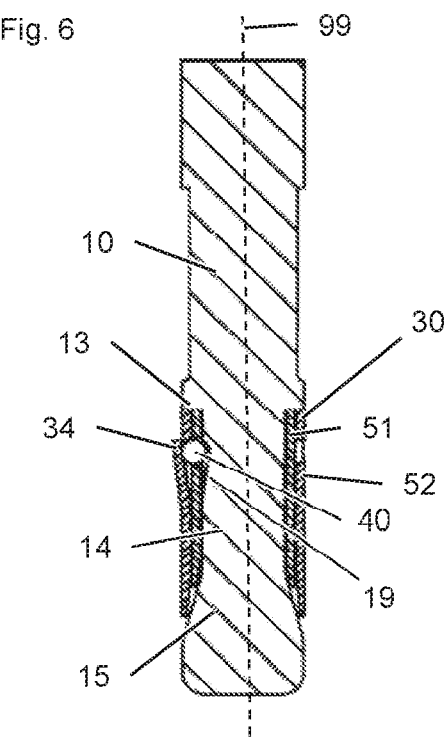
FIG. 6 is a longitudinal sectional view, analogous to FIG. 4, of a second modification to the expansion anchor of FIGS. 1 to 4.
Figure 7:
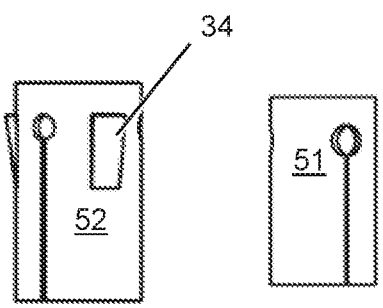
FIG. 7 is a side view of the individual sleeves of the modified expansion anchor according to FIG. 6.

In a second modification of the first embodiment, as shown in FIGS. 6 and 7, the expansion sleeve 30 is designed in two layers and so as to have two coaxial individual sleeves 51 and 52. Otherwise, this second modification corresponds to the first embodiment, and therefore reference is made to FIGS. 1 and 2 and to the description of the first embodiment, which also apply to the second modification.

The individual sleeve 51 is arranged within the individual sleeve 52. The tongues 34 are fastened to the outer individual sleeve 52 and are integral with the outer individual sleeve 52. The outer individual sleeve 52 projects toward the front beyond the inner individual sleeve 51.

The invention claimed is:
1. An expansion anchor, comprising:
an anchor bolt; and
an expansion sleeve which encompasses the anchor bolt;

wherein the anchor bolt has an expansion-sleeve expansion region and an expansion-element expansion region;

wherein the expansion sleeve has an expansion element which is disposed on the expansion sleeve;

wherein the expansion sleeve is radially displaceable by the expansion-sleeve expansion region;

wherein the expansion element is radially displaceable by the expansion-element expansion region;

wherein the expansion element is disposed on a radial inside of the expansion sleeve and is disposed radially between the anchor bolt and the expansion sleeve such that the expansion element is not exposed radially on an outside of the expansion element and is covered radially on the outside by the expansion sleeve.

2. The expansion anchor according to claim 1, wherein the expansion element touches the anchor bolt.

3. The expansion anchor according to claim 1, wherein the expansion element is disposed in a recess which is formed in the expansion sleeve.

4. The expansion anchor according to claim 3, wherein the expansion sleeve is perforated at the recess.

5. The expansion anchor according to claim 1, wherein a tongue of the expansion sleeve radially covers the expansion element.

6. The expansion anchor according to claim 5, wherein the expansion element is disposed in a recess which is formed in the expansion sleeve and wherein the tongue radially covers the recess at least in a region.

7. The expansion anchor according to claim 5, wherein the tongue points away from the expansion-sleeve expansion region.

8. The expansion anchor according to claim 5, wherein the tongue projects radially on an outside of the expansion sleeve and/or the tongue forms a barb which prevents the expansion sleeve from being pulled out of a borehole.

9. The expansion anchor according to claim 1, wherein the expansion element is a rolling element.

10. The expansion anchor according to claim 1, wherein the expansion-element expansion region and the expansion-sleeve expansion region have a respective steepness that is different from one another.

11. The expansion anchor according to claim 1, wherein the anchor bolt has an indentation in which the expansion element is disposable and wherein the expansion-element expansion region is formed on a wall of the indentation.

12. The expansion anchor according to claim 1, wherein the expansion sleeve is formed in multiple layers.

13. The expansion anchor according to claim 1, wherein the anchor bolt has a driver and wherein the expansion sleeve is driveable by the driver toward a front.

14. A method for using the expansion anchor according to claim 1, comprising the steps of:

shifting the anchor bolt relative to the expansion sleeve, and by the shifting, radially displacing the expansion sleeve by the expansion-sleeve expansion region and radially displacing the expansion element by the expansion-element expansion region.

* * * * *